US009796900B2

(12) United States Patent
Salgaonkar et al.

(10) Patent No.: US 9,796,900 B2
(45) Date of Patent: Oct. 24, 2017

(54) ALKALINE PERSULFATE FOR LOW-TEMPERATURE BREAKING OF POLYMER VISCOSIFIED FLUID

(71) Applicants: Lalit Pandurang Salgaonkar, Pune (IN); Achala V. Danait, Pune (IN); Chetan Prakash, Pune (IN)

(72) Inventors: Lalit Pandurang Salgaonkar, Pune (IN); Achala V. Danait, Pune (IN); Chetan Prakash, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 446 days.

(21) Appl. No.: 13/709,480

(22) Filed: Dec. 10, 2012

(65) Prior Publication Data

US 2013/0098611 A1 Apr. 25, 2013

Related U.S. Application Data

(63) Continuation-in-part of application No. 13/166,442, filed on Jun. 22, 2011, now Pat. No. 9,062,243.

(51) Int. Cl.

| | | |
|---|---|---|
| *C09K 8/68* | (2006.01) | |
| *C09K 8/00* | (2006.01) | |
| *E21B 33/138* | (2006.01) | |
| *E21B 43/26* | (2006.01) | |
| *E21B 43/04* | (2006.01) | |
| *E21B 43/16* | (2006.01) | |
| *B08B 9/02* | (2006.01) | |

(52) U.S. Cl.
CPC ............... *C09K 8/00* (2013.01); *B08B 9/02* (2013.01); *C09K 8/68* (2013.01); *C09K 8/685* (2013.01); *E21B 33/138* (2013.01); *E21B 43/04* (2013.01); *E21B 43/16* (2013.01); *E21B 43/26* (2013.01); *C09K 2208/26* (2013.01)

(58) Field of Classification Search
CPC ...... C09K 8/68; C09K 8/605; C09K 2208/12; C09K 2208/32; C09K 8/04; C09K 8/22; C09K 8/28; C09K 8/34; C09K 8/44; C09K 8/524; C09K 8/54; C09K 8/58; C09K 8/584; C09K 8/685; C09K 8/86; E21B 19/09; E21B 19/10; E21B 2021/006; E21B 2021/007; E21B 21/015; E21B 23/00; E21B 29/00; E21B 29/02; E21B 29/12; E21B 31/20; E21B 33/085; E21B 33/1208; E21B 33/1285; E21B 33/14

See application file for complete search history.

(56) References Cited

U.S. PATENT DOCUMENTS

| | | | |
|---|---|---|---|
| 3,167,510 A | 1/1965 | Alter | |
| 3,811,902 A * | 5/1974 | Podlas | C08F 8/00 106/198.1 |
| 4,144,179 A * | 3/1979 | Chatterji | C09K 8/62 106/198.1 |
| 6,784,141 B1 | 8/2004 | King et al. | |
| 6,987,083 B2 * | 1/2006 | Phillippi | C08B 37/0033 166/278 |
| 7,004,254 B1 | 2/2006 | Chatterji et al. | |
| 7,232,793 B1 | 6/2007 | King et al. | |
| 7,271,134 B2 | 9/2007 | King et al. | |
| 7,482,310 B1 * | 1/2009 | Reese | C09K 8/64 166/270 |
| 7,806,185 B2 | 10/2010 | McMechan et al. | |
| 7,846,878 B2 | 12/2010 | Robb et al. | |
| 2008/0176770 A1 * | 7/2008 | Sanders | C09K 8/524 507/213 |
| 2010/0268469 A1 | 10/2010 | Harrison et al. | |
| 2011/0059883 A1 * | 3/2011 | Swazey, Jr. | C08L 1/02 510/320 |

FOREIGN PATENT DOCUMENTS

EP 1267034 * 12/2002

OTHER PUBLICATIONS http://www.glossary.oilfield.slb.com/en/Terms/f/fann_viscometer.aspx downloaded on Aug. 5, 2015.*
N. Guven, D.J. Panfil, L.L. Carney, Evaluation of saponite and saponite/sepiolite fluids for geothermal drilling, Contractor Report submitted to Sandia National Laboratories, year 1991.*
Philip A. Block, Richard A. Brown, David Robinson, "Novel Activation Technologies for Sodium Persulfate in Situ Chemical Oxidation," Proceedings of the Fourth International Conference on the Remediation of Chlorinated and Recalcitrant Compounds, 2004, 8 pages.
Olha S. Furman, Amy L. Teel, Richard J. Watts, "Mechanism of Base Activation of Persulfate," Environmental Science and Technology, vol. 44, Aug. 15, 2010, pp. 6423-6428.

* cited by examiner

*Primary Examiner* — Kumar R Bhushan
(74) *Attorney, Agent, or Firm* — Craig W. Roddy; Baker Botts L.L.P.

(57) ABSTRACT

A persulfate compound activated by a strong base is used for low-temperature breaking of fluids viscosified with one or more water-soluble synthetic polymers, wherein the water-soluble synthetic polymers are selected from the group consisting of polyacrylamides, copolymers of polyacrylamide, derivatives of polyacrylamide or of copolymers of polyacrylamide, and any combination thereof. The breaker system can be used in an oilfield or pipeline application where such a synthetic polymer, a multi-chain polysaccharide, or combination thereof may be present in a fluid. It is particularly useful at low temperatures of less than 100° F.

16 Claims, No Drawings

ALKALINE PERSULFATE FOR LOW-TEMPERATURE BREAKING OF POLYMER VISCOSIFIED FLUID

CROSS-REFERENCE TO RELATED APPLICATIONS

This application is a continuation-in-part of U.S. application Ser. No. 13/166,442 filed on 22 Jun. 2011.

TECHNICAL FIELD

The inventions are in the field of producing crude oil or natural gas and to pipeline transmission of oil or gas. More specifically, the inventions generally relate to low-temperature breaking of fluids viscosified with a synthetic polymer, a multi-chain polysaccharide, or combination thereof.

BACKGROUND

Potential Sources of Water for Use in Well Fluids or Pipeline Fluids

Non-freshwater sources of water for use in well fluids can include surface water ranging from brackish water to seawater to brine. As used herein, a brine refers to a water having at least 40,000 mg/L total dissolved solids.

Additional potential sources of water for use in well fluids can include returned water (sometimes referred to as flowback water) after the delivery and use of a well fluid in a well, unused well fluid that was formed but never introduced into a well, and produced water from a well.

Another potential source of water for use in well fluids can include push pills, that is, slugs of water that have been viscosified with a synthetic polymer or a multi-chain polysaccharide used to push fluids to clean out an oil or gas transmission pipeline located at or near the surface of the ground or seafloor.

In some cases, however, a flowback water, unused well water, or produced water can have an undesirably high viscosity due to a residual viscosity-increasing polymer, which may or may not be cross-linked, that was not completely broken in the well before flowing back. Similarly, a push pill can have an undesirably high viscosity for use in a well treatment fluid. To use such a source of water in forming another well fluid, it may be necessary to break the residual viscosity caused by the residual polymeric material.

Complicating factors exists, however, in breaking a residual polymer that may exist in such sources of water: the source of the water is usually above ground and at a temperature below 100° F., usually in the range of about 80° F. to about 100° F. It is usually much more difficult to break polymeric material at such low temperatures using conventional breakers. In addition, multi-chain polymers and synthetic polymers are usually much more difficult to break than single-chain polysaccharides. Polyacrylamides are known to have good thermal stability up to 200° F.; thus are difficult to break at low temperatures, especially below about 90° F. At least these two factors make the use of such potential sources of non-freshwater in forming another well fluid very challenging.

Water-Soluble Polymers Used in Well Fluids

Common water-soluble polymers used in well fluids include polysaccharides and synthetic polymers.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

Xanthan gum (commonly referred to simply as xanthan) is a polysaccharide, derived from the bacterial coat of *Xanthomonas campestris*. It is produced by fermentation of glucose, sucrose, or lactose by the *Xanthomonas campestris* bacterium.

Diutan gum (commonly referred to simply as diutan) is another multi-chain polysaccharide that is sometimes used to increase viscosity in well fluids.

Water-soluble synthetic polymers are also used. An example of a water-soluble synthetic polymer that is commonly used in well fluids is polyacrylamide or derivative of polyacrylamide. As used herein, a "polyacrylamide" can broadly include a copolymer of polyacrylamide (including, for example, a copolymer, terpolymers, or tetrapolymer). In addition, a "polyacrylamide" can broadly include a modified or derivative of a polyacrylamide, unless the context otherwise requires. Certain polyacrylamides can be classified as multi-chain polymers. Regardless of whether multi-chain or not, however, water-soluble synthetic polymers, and polyacrylamides in particular, are known to be difficult to break.

As used herein, a "polysaccharide" can broadly include a modified or derivative polysaccharide, unless the context otherwise requires.

As used herein, "modified" or "derivative" means a compound or substance formed by a chemical process from a parent compound or substance, wherein the chemical skeleton of the parent is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete. Substitution is an example of a modification or derivatization process. Substitution on a polymeric material may be partial or complete.

Well Services

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well. Such well fluids commonly include polymeric materials.

Drilling, completion, and intervention operations can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil and gas from a well. Even small improvements in fluid flow can yield dramatic production results.

Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Fracturing treatments are often applied in treatment zones having poor natural permeability. Matrix treatments are often applied in treatment zones having good natural permeability to counteract damage in the near-wellbore area.

Other types of completion or intervention treatments can include, for example, gravel packing, consolidation, and controlling excessive water production. Still other types of completion or intervention treatments include, but are not limited to, damage removal, formation isolation, wellbore cleanout, scale removal, and scale control.

Water-Soluble Polymers for Suspending Particulate in a Well Fluid

A well fluid can be adapted to be a carrier fluid for particulates.

For example, during drilling, rock cuttings should be carried uphole by the drilling fluid and flowed out of the wellbore. The rock cuttings typically have specific gravity greater than 2, which is much higher than that of many drilling fluids. These high-density cuttings have a tendency to separate from water or oil very rapidly.

Hydraulic fracturing is a common stimulation treatment. The purpose of a hydraulic fracturing treatment is to provide an improved flow path for oil or gas to flow from the hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range. For various purposes, the gravel particulates also may be coated with certain types of materials, including resins, tackifying agents, and the like. For example, a tackifying agent can help with fines and resins can help to enhance conductivity (e.g., fluid flow) through the gravel pack.

A proppant used in fracturing or a gravel used in gravel packing may have a much different density than the carrier fluid. For example, sand has a specific gravity of about 2.7, whereas water has a specific gravity of 1.0 at Standard Laboratory Conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient to match the density of the particulate.

Increasing the viscosity of a well fluid can help prevent a particulate having a different specific gravity than a surrounding phase of the fluid from quickly separating out of the fluid.

A viscosity-increasing agent can be used to increase the ability of a fluid to suspend and carry a particulate material in a well fluid. A viscosity-increasing agent can be used for other purposes, such as matrix diversion, conformance control, or friction reduction.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser amount of the viscosity-increasing agent in order to achieve the desired fluid viscosity in a large volume of fracturing fluid.

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (e.g., polyacrylamide). The most common water-soluble polysaccharides employed in well treatments are guar and its derivatives.

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 to about 50 cp. When a base gel is crosslinked, the viscosity is increased by 2 to 100 times depending on the temperature, the type of viscosity testing equipment and method, and the type of crosslinker used.

The degree of crosslinking depends on the type of viscosity-increasing polymer used, the type of crosslinker, concentrations, temperature of the fluid, etc. Shear is usually required to mix the base gel and the crosslinking agent. Thus, the actual number of crosslinks that are possible and that actually form also depends on the shear level of the system. The exact number of crosslink sites is not well known, but it could be as few as one to about ten per polymer molecule. The number of crosslinks is believed to significantly alter fluid viscosity.

For a polymeric viscosity-increasing agent, any crosslinking agent that is suitable for crosslinking the chosen monomers or polymers may be used.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Other Uses of Water-Soluble Polymers in Well Fluids, for Example, as Friction Reducers There are other uses for a polymers in a well fluid. For example, a polymer may be used as a friction reducer.

During the drilling, completion and stimulation of subterranean wells, well fluids are often pumped through tubular structures (e.g., pipes, coiled tubing, etc.). A considerable amount of energy may be lost due to turbulence in the treatment fluid. Because of these energy losses, additional horsepower may be necessary to achieve the desired treatment. To reduce these energy losses, certain polymers (referred to herein as "friction-reducing polymers") have been included in these treatment fluids.

Friction reducers are typically used to reduce fluid turbulence and thus save the energy which would have been otherwise lost due to fluid friction with tubular. This effectively reduces the hydraulic power demands of the particular operation. In addition, the reduced turbulence also effectively reduces the erosion effect on the tubular.

Friction reducer chemicals are regularly employed in slick water fracturing in shale gas plays, in high rate water pack ("HRWP") treatments used to place gravel between the annular space of the formation and screen, in reducing the friction of fluids flowing down coil tubing, etc.

Suitable friction reducing polymers should reduce energy losses due to turbulence within the treatment fluid. Those of ordinary skill in the art will appreciate that the friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable friction reducing polymers may be at least about 2,500,000, as determined using intrinsic viscosities. In certain embodiments, the average molecular weight of suitable friction reducing polymers may be in the range from about 7,500,000 to about 20,000,000. Those of ordinary skill in the art will recognize that friction-reducing polymers having molecular weights outside the listed range may still provide some degree of friction reduction.

A wide variety of friction reducing polymers are available. In certain embodiments, the friction-reducing polymer may be a synthetic polymer. While several chemicals and polymeric additives can function as friction reducers, the most commonly used chemicals are polyacrylamides and polyacrylamide copolymers. Additionally, for example, the friction-reducing polymer may be an anionic polymer or a cationic polymer.

By way of example, suitable synthetic polymers may include any of a variety of monomeric units, including acrylamide, acrylic acid, 2-acrylamido-2-methylpropane sulfonic acid, N,N-dimethylacrylamide, tert-butyl acrylamide, vinyl sulfonic acid, N-vinyl acetamide, N-vinyl formamide, itaconic acid, methacrylic acid, acrylic acid esters, methacrylic acid esters, quaternized aminoalkyl acrylate, such as a copolymer of acrylamide and dimethylaminoethyl acrylate quaternized with benzyl chloride, and mixtures thereof.

Examples of suitable friction reducing polymers are described in: U.S. Pat. No. 6,784,141 issued Aug. 31, 2004 having for named inventors Karen L. King, David E. Mcmechan, and Jiten Chatterji entitled "Methods, Aqueous Well Treating Fluids and Friction Reducers Therefor"; U.S. Pat. No. 7,004,254 issued on Feb. 28, 2006 having for named inventors Jiten Chatterji, Karen L. King, and David E. McMechan entitled "Subterranean Treatment Fluids, Friction Reducing Copolymers, and Associated Methods"; U.S. Pat. No. 7,232,793 issued Jun. 19, 2007 having for named inventors Karen L. King, David E. McMechan; and Jiten Chatterji entitled "Water-Based Polymers for Use as Friction Reducers in Aqueous Treatment Fluids"; U.S. Pat. No. 7,271,134 issued Sep. 18, 2007 having for named inventors Karen L. King, David E. McMechan; and Jiten Chatterji entitled "Water-Based Polymers for Use as Friction Reducers in Aqueous Treatment Fluids"; each of which is incorporated herein by reference in the entirety. Combinations of suitable friction reducing polymers may also be suitable for use.

One example of a suitable anionic friction-reducing polymer is a polymer including at least acrylamide and acrylic acid monomeric units. The acrylamide and acrylic acid may be present in the polymer in any suitable concentration. An example of a suitable anionic friction reducing polymer may include at least acrylamide monomer in an amount in the range of from about 5% to about 95% and acrylic acid monomer in an amount in the range of from about 5% to about 95%. Another example of a suitable anionic friction-reducing polymer may include acrylamide in an amount in the range of from about 60% to about 90% by weight and acrylic acid in an amount in the range of from about 10% to about 40% by weight. Another example of a suitable anionic friction-reducing polymer may include acrylamide in an amount in the range of from about 80% to about 90% by weight and acrylic acid in an amount in the range of from about 10% to about 20% by weight. Yet another example of a suitable anionic friction-reducing polymer may include acrylamide in an amount of about 85% by weight and acrylic acid in an amount of about 15% by weight. As previously mentioned, one or more additional monomers may be included in the anionic friction reducing polymer including acrylamide and acrylic acid monomeric units. By way of example, the additional monomer(s) may be present in the anionic friction-reducing polymer in an amount up to about 20% by weight of the polymer.

Suitable friction-reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. As used herein, the term "polymer" is intended to refer to the acid form of the friction-reducing polymer, as well as its various salts.

As will be appreciated, the friction-reducing polymers suitable for use in the present technique may be prepared by any suitable technique. For example, the anionic friction-reducing polymer including acrylamide and acrylic acid may be prepared through polymerization of acrylamide and acrylic acid or through hydrolysis of polyacrylamide (e.g., partially hydrolyzed polyacrylamide). See, for example, U.S. Pat. Nos. 7,846,878 and 7,806,185, which are incorporated by reference.

Slick-Water Fracturing of Shale Formations

An example of a well treatment that may utilize a friction-reducing polymer is commonly referred to as "high-rate water fracturing" or "slick-water fracturing," which is commonly used for fracturing of ultra-low permeable formations such as shale formations.

Ultra-low permeable formations tend to have a naturally occurring network of multiple interconnected micro-sized fractures. The fracture complexity is sometimes referred to in the art as a fracture network. Ultra-low permeable formations can be fractured to create or increase such multiple interconnected micro-sized fractures. This approach can be used to help produce gas from such an ultra-low permeable formation. According to current technology, a shale formation suitable for economic recovery as a gas reservoir is characterized by having a hydrocarbon content greater than 2% by volume gas filled porosity.

Ultra-low permeable formations are usually fractured with water-based fluids having little viscosity and that are used to suspend relatively low concentrations of proppant. The size of the proppant is sized to be appropriate for the fracture complexity of such a formation, which is much smaller than used for fracturing higher permeability formations such as sandstone or even tight gas reservoirs. The overall purpose is to increase or enhance the fracture complexity of such a formation to allow the gas to be produced. Although the fractures of the fracture network are very small compared to fractures formed in higher permeability formations, they should still be propped open.

The fracturing fluids for use in fracturing ultra-low permeability formations are water-based. One of the reasons for this is the large volumes required, and water is relatively low cost compared to oil-based fluids. Other reasons can include concern for damaging the reservoir and environmental concerns.

Fluids used for fracture treatments in gas shale reservoirs are mainly water based fluids mixed with friction reducer chemicals (slick water). Most friction reducers used in slickwater fracturing are provided as concentrated emulsions of high molecular weight polyacrylamide, which can be easily inverted to dissolve the friction reducer in water. The typical concentration of these friction reducers ranges from 0.5 to 2.0 gal/Mgal. In cases where huge volumes of such fracturing fluids are used along with several stages per well, a large amount of such friction reducer chemicals are introduced into the formation. Use of suitable chemicals that can function as breakers for these friction reducers is essential to ensure minimal formation damage due to the fracturing fluid.

Preferably, a friction-reducing polymer can be included in a well fluid in an amount equal to or less than 0.2% by weight of the water present in the well fluid. Preferably, any friction-reducing polymers are included in a concentration sufficient to reduce friction but at a lower concentration than would develop the characteristic of a gel. By way of example, the well fluid including the friction-reducing polymer would not exhibit an apparent yield point.

While the addition of a friction-reducing polymer may minimally increase the viscosity of the treatment fluids, the polymers are not included in the treatment fluids in an amount sufficient to greatly increase the viscosity. For example, if proppant is included in the treatments fluid, velocity rather than fluid viscosity generally may be relied on for proppant transport. In some embodiments, the friction-reducing polymer can be present in an amount in the range of from about 0.01% to about 0.15% by weight of the well fluid. In some embodiments, the friction-reducing polymer can be present in an amount in the range of from about 0.025% to about 0.1% by weight of the well fluid.

Generally, the treatment fluids in slick-water fracturing do not rely on viscosity for proppant transport. Where particulates (e.g., proppant, etc.) are included in the fracturing fluids, the fluids rely on at least velocity to transport the particulates to the desired location in the formation. Preferably, a friction-reducing polymer is used in an amount that is sufficient to provide the desired friction reduction without appreciably viscosifying the fluid and usually without a crosslinker. As a result, the fracturing fluids used in these high-rate water-fracturing operations generally have a lower viscosity than conventional fracturing fluids for conventional formations. In some slick-water fracturing embodiments, the treatment fluids may have a viscosity up to about 10 centipoise ("cP"). In some embodiments, the treatment fluids may have a viscosity in the range of from about 7.0 cP to about 10 cP. According to a preferred embodiment of the methods, at least the first fracturing fluid has a viscosity in the range of about 7.0 cP to about 10 cP. According to a more preferred embodiment, all of the one or more fracturing fluids used in a zone have a viscosity in the range of about 7.0 cP to about 10 cP. For the purposes of this disclosure, viscosities are measured at room temperature using a FANN™ Model 35 viscometer at 300 rpm with F1 spring.

High Rate Water Pack for Sand Control

High rate water pack ("HRWP") technique used in sand control operation employs high pumping pressure to assist suspension and carrying of gravel to pack the formation to screen annulus. Friction reducers are often employed in such a technique to avoid high pressure within the open hole section as it can fracture the formation if the fracture pressures are exceeded. Breakers are required to act on the friction reducer chemicals in the recovered and circulated HRWP fluids prior to proper disposal.

Breaker for Water-Soluble Polymer

Reducing the viscosity of a viscosified fluid is referred to as "breaking" the fluid. Chemicals used to reduce the viscosity of well fluids are called breakers.

No particular mechanism is necessarily implied by the term "breaking." For example, in the case of a crosslinked viscosity-increasing agent, for example, one way to diminish the viscosity is by breaking the crosslinks. By way of another example, a breaker can reduce the molecular weight of a water-soluble polymer by cutting the long polymer chain. As the length of the polymer chain is cut, the viscosity of the fluid is reduced. This process can occur independently of any crosslinking bonds existing between polymer chains.

Breakers must be selected to meet the needs of each situation. First, it is important to understand the general performance criteria of breakers. For example, in reducing the viscosity of a fracturing fluid or gravel packing fluid to a near water-thin viscosity, the breaker must maintain a critical balance. Premature reduction of viscosity during the pumping of the treatment fluid can jeopardize the treatment. Inadequate reduction of fluid viscosity after pumping can also reduce production if the required conductivity is not obtained.

Chemical breakers used to reduce viscosity of a fluid viscosified with a viscosifying polymer, such as guar and derivatized guar polymers, used in fracturing or other subterranean applications are generally grouped into three classes: oxidizers, enzymes, and acids. All of these materials reduce the viscosity of the fluid by breaking the polymer chain. The breakers operate by cleaving the backbone of polymer either by hydrolysis of acetyl group, cleavage of glycosidic bonds, oxidative/reductive cleavage, free radical breakage or combination of these processes. A breaker should be selected based on its performance in the temperature, pH, time, and desired viscosity profile for each specific treatment.

Breaking Multi-Chain Polysaccharides More Difficult

Fluids viscosified with a multi-chain polysaccharide can be more difficult to break than fluids viscosified with a single-chain polysaccharide. In particular, there are few methods available to break the fluid viscosity of a fluid viscosified with a multi-chain polysaccharide at low temperatures (below 120° F. or 49° C.), and they suffer from various problems. For example, the use of hypochlorite poses corrosion concerns and may not provide sufficient delay of the break. The current use of persulfate requires high concentrations and high volumes at lower temperatures. The use of oxidizers such as sodium chlorite is limited to high-temperature applications and may react violently to cause a fire when reducing agents are used in the process. Enzymes do not work well on multi-chain polysaccharides such as xanthan at low temperatures.

Sodium perborate and ethyl acetoacetate ("EAA") have been reported as being capable of breaking the viscosity of a fluid viscosified with a typical xanthan gum ("XANVIS") down to 80° F. (27° C.). See Kelco Oilfield Group in its Technical Bulletin entitled "Breaker Applications," revised January 2004. However, Halliburton previously reported that it was unable to break a fluid viscosified with xanthan at very low temperature using the published recipe and the publication does not provide sufficient detail to allow the user to optimize the breaker recipe for a given set of conditions. U.S. Patent Publication No. US 2008/0176770 A1, published Jul. 24, 2008, having for named inventors Michael W. Sanders, et al., which is incorporated by reference in its entirety.

A treatment fluid for use in a well can optionally comprise an activator or a retarder to, among other things, optimize the break rate provided by a breaker. Previously known examples of such activators include acid generating materials, chelated iron, copper, cobalt, and reducing sugars. Previously known examples of retarders include sodium thiosulfate, methanol, and diethylenetriamine.

SUMMARY OF THE INVENTION

According to an embodiment of the invention, a persulfate compound activated by a strong base can be used for low-temperature breaking of a fluid viscosified with a synthetic polymer, a multi-chain polysaccharide, or any combination thereof. The breaker system according to the invention can be used in an oilfield or pipeline application where a synthetic polymer, a multi-chain polysaccharide, or any combination thereof is in a fluid having an undesirably high viscosity. The water-soluble synthetic polymer is preferably selected from the group consisting of polyacrylamides, copolymers of polyacrylamide, derivatives of polyacrylamide, derivatives of polyacrylamide copolymer, and any combination thereof. It is particularly useful at low and very low temperatures, which may be encountered, for example, for a flowback fluid, unused well fluid, or produced water that is above ground.

The features and advantages of the present invention will be apparent to those skilled in the art. While numerous changes may be made by those skilled in the art, such changes are within the spirit of the invention.

DETAILED DESCRIPTION OF PRESENTLY PREFERRED EMBODIMENTS AND BEST MODE

General Definitions and Usages

Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. are assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there by any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

The control or controlling of a condition includes any one or more of maintaining, applying, or varying of the condition. For example, controlling the temperature of a substance can include maintaining an initial temperature, heating, or cooling.

Oil and Gas Reservoirs

In the context of production from a well, however, oil and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Servicing and Well Fluids

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Wells

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or well fluids can be directed from the wellhead into any desired portion of the wellbore.

As used herein, the word "tubular" means any kind of body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location.

As used herein, a "well fluid" broadly refers to any fluid adapted to be introduced into a well for any purpose. A well fluid can be, for example, a drilling fluid, a setting composition, a treatment fluid, or a spacer fluid. If a well fluid is to be used in a relatively small volume, for example less than about 200 barrels (about 8,400 US gallons or about 32 m$^3$), it is sometimes referred to as a wash, dump, slug, or pill.

As used herein, the word "treatment" refers to any treatment for changing a condition of a portion of a pipeline, a wellbore, or a subterranean formation adjacent a wellbore; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment at the time of a treatment. For example, the design temperature for a well treatment takes into account not only the bottom hole static temperature ("BHST"), but also the effect of the temperature of the well fluid on the BHST during treatment. The design temperature for a well fluid is sometimes referred to as the bottom hole circulation temperature ("BHCT"). Because well treatment fluids may be considerably cooler than BHST, the difference between the two temperatures can be quite large. Ultimately, if left undisturbed, a subterranean formation will return to the BHST.

Pipelines

"Pipeline transport" refers to a conduit made from pipes connected end-to-end for long-distance fluid transport. Oil pipelines are made from steel or plastic tubulars with inner diameter typically from 4 to 48 inches (100 to 1,200 mm). Most pipelines are typically buried at a depth of about 3 to 6 feet (0.91 to 1.8 m). To protect pipes from impact, abrasion, and corrosion, a variety of methods are used. These can include wood lagging (wood slats), concrete coating, rockshield, high-density polyethylene, imported sand padding, and padding machines. The oil is kept in motion by pump stations along the pipeline, and usually flows at speed of about 3.3 to 20 ft/s (1 to 6 meters per second).

Gathering pipelines are a group of smaller interconnected pipelines forming complex networks with the purpose of bringing crude oil or natural gas from several nearby wells to a treatment plant or processing facility. In this group, pipelines are usually relatively short (usually about 100 to 1000 yards or meters) and with small diameters (usually about 4 to about 12 inches). Also sub-sea pipelines for collecting product from deep water production platforms are considered gathering systems.

Transportation pipelines are mainly long pipes (many miles or kilometers) with large diameters (larger than 12 inches or 30 cm), moving products (oil, gas, refined products) between cities, countries, and even continents. These transportation networks include several compressor stations in gas lines or pump stations for crude oil or multi-product pipelines.

Distribution pipelines are composed of several interconnected pipelines with small diameters (usually about 1 to about 4 inches), used to take the products to the final consumer. An example of distribution pipelines is feeder lines to distribute natural gas to homes and businesses downstream. Pipelines at terminals for distributing products to tanks and storage facilities are included in this group.

Physical States, Phases, and Materials

The common physical states of matter include solid, liquid, and gas.

As used herein, "phase" is used to refer to a substance having a chemical composition and physical state that is distinguishable from an adjacent phase of a substance having a different chemical composition or a different physical state.

The word "material" is anything made of matter, constituted of one or more phases. Rock, water, air, metal, cement slurry, sand, and wood are all examples of materials.

As used herein, if not otherwise specifically stated, the physical state (e.g., solid or fluid) of a substance (or mixture of substances) and other physical properties are determined at a temperature of 77° F. (25° C.) and a pressure of 1 atmosphere (Standard Laboratory Conditions) without applied shear.

Hydratability or Solubility

As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water.

A substance is considered to be "soluble" in a liquid if at least 1.0 gram of the substance can be dissolved in one liter of the liquid when tested at 77° F. and 1 atmosphere pressure for 2 hours, considered to be "insoluble" if less than 1.0 gram per liter.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

As used herein, the term "polar" means having a dielectric constant greater than 30. The term "relatively polar" means having a dielectric constant greater than about 2 and less than about 30. "Non-polar" means having a dielectric constant less than 2.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

As used herein, a fluid is a substance that behaves as a fluid under Standard Laboratory Conditions, that is, at 77° F. (25° C.) temperature and 1 atmosphere pressure, and at the higher temperatures and pressures usually occurring in subterranean formations without applied shear.

Every fluid inherently has at least a continuous phase. A fluid can have more than one phase. The continuous phase of a well fluid is a liquid under Standard Laboratory Conditions. For example, a well fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

As used herein, a water-based fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In contrast, "oil-based" means that oil is the dominant material by weight of the continuous phase of the fluid. In this context, the oil of an oil-based fluid can be any oil, based on the combined weight of oil and any other solvents in the phase (that is, excluding the weight of any dissolved solids).

In the context of a well fluid, oil is understood to refer to an oil liquid, whereas gas is understood to refer to a physical state of a substance, in contrast to a liquid. In general, an oil is any substance that is liquid under Standard Laboratory Conditions, is hydrophobic, and soluble in organic solvents. Oils have a high carbon and hydrogen content and are non-polar substances. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear strain.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the rate of shear strain in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most well fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of centipoise ("cP").

Like other physical properties, the viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

Historically, to be considered to be suitable for use as a carrier fluid for a proppant for conventional reservoirs or applications such as gravel packing, it has been believed that a crosslinked gel needs to exhibit sufficient viscoelastic properties, in particular relatively high viscosities (e.g., at least about 300 to 500 cP at a shear rate of 100 sec-1). One aspect of such gel behavior may be described in the art as "lipping," which may be distinguishable from freely pouring when poured out of a container. "Lipping" as used herein refers to a gel being deformable but retaining a coherent structure that has a lower tendency to disperse than a liquid such as water. Lipping depends on the lifetime of the crosslinking. Fluids are considered lipping if they form a lip when tilted, and that lip will not tear.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or 50 viscometer or a CHANDLER™ 5550 HPHT viscometer, that measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

Most well fluids are non-Newtonian fluids. Accordingly, the apparent viscosity of a fluid applies only under a particular set of conditions including shear stress versus shear rate, which must be specified or understood from the context. Unless otherwise specified, as used herein the apparent viscosity of a fluid (excluding any suspended solid particulate larger than silt) is measured with a Fann Model 35 type viscometer at a shear rate of 511 l/s and at 77° F. (25° C.) and a pressure of 1 atmosphere. Apparent viscosity is reported in units of centipoise (cP). For reference, the viscosity of pure water is 1 cP. In the oilfield and as used herein, unless the context otherwise requires it is understood that "viscosity" is actually a reference to apparent viscosity.

A substance is considered to be a fluid if it has an apparent viscosity less than 5,000 cP (independent of any gel characteristic).

As used herein, a fluid is considered to be "viscous" if it has an apparent viscosity of 10 cP or higher. The viscosity of a viscous fluid is considered to break or be broken if the viscosity is greatly reduced. Preferably, although not necessarily for all applications depending on how high the initial viscosity of the fluid, the viscous fluid breaks to a viscosity of 5 cP or lower.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

As used herein, "% wt/vol" means the mass-volume percentage, sometimes referred to as weight-volume percentage or percent weight per volume and often abbreviated as % m/v or % w/v, which describes the mass of the solute in g per 100 mL of the liquid. Mass-volume percentage is often used for solutions made from a solid solute dissolved in a liquid. For example, a 40% w/v sugar solution contains 40 g of sugar per 100 mL of liquid.

Unless otherwise specified, any doubt regarding whether units are in U.S. or Imperial units, where there is any difference U.S. units are intended herein. For example, "gal/Mgal" means U.S. gallons per thousand U.S. gallons.

General Purposes and Applications of the Invention

Fluids viscosified with a synthetic polymer or a multi-chain polysaccharide are very commonly used in gravel packing operations, sometimes in fracturing operations, and occasionally in other well treatments. An example of a synthetic polymer is a polyacrylamide. Examples of a multi-chain polysaccharide include diutan, scleroglucan, and xanthan.

There are some situations where it would be valuable to be able to break a fluid viscosified with a synthetic polymer or a multi-chain polysaccharide at low temperatures. Surface or near surface applications at temperatures typically below 100° F., include, for example:

(a) breaking a flow-back fluid from a well, in which a synthetic polymer or a multi-chain polysaccharide was used to increase viscosity of a well fluid used in the well.

(b) breaking unused well fluids that were viscosified with a synthetic polymer or a multi-chain polysaccharide but not actually introduced into the well. This occurs, for example, when all the made-up fluid was not actually needed, leaving an excess of the unused well fluid.

(c) breaking of push pills, that is, where a slug viscosified with a synthetic polymer or a multi-chain polysaccharide is used to push fluids to clean out an oil or gas transmission pipeline located at or near the surface of the ground or seafloor.

Surface applications would be conveniently performed on or near the well site. Such applications would be more economical if it were not necessary to heat the fluid to achieve the break of undesired viscosity.

Downhole well applications at temperatures that can be below 100° F., include, for example: (a) gravel pack fluids used in shallow wells; and (b) push pills, for example as a slug, to push other fluids in a well or subterranean formation.

Such downhole applications would be more economical if it were not necessary to heat the well fluid to effect the break of undesired viscosity.

For example, in some well applications, it is desirable to have a delayed break of the fluid viscosified with a synthetic polymer or a multi-chain polysaccharide in the well at less than 100° F.

Synthetic polymers and multi-chain polysaccharides are typically more difficult to break than single-chain polysaccharides. This is especially a problem at low temperatures. Generally, to break fluid viscosified with a polyacrylamide or polysaccharide requires the generation of a certain number of cleavages in the polymer backbone so as to break the polymer and cause the desired reduction in viscosity of the fluid. The polyacrylamides or multi-chain polysaccharides require more cleavages of the polymer backbone than for a single-chain polysaccharide to break the viscosity.

It is known in the art, however, that the effectiveness of an oxidizer for breaking a polyacrylamide or polysaccharide decreases with decreasing temperature. Various oxidizer systems are available to break a fluid viscosified with xanthan at high and even moderate temperatures; however, most of them cannot achieve similar breaking results at low temperatures, which in this context means less than 100° F. Known oxidizers are essentially ineffective for this purpose at low temperatures of less than 100° F.

For example, oxidizers such as hypochlorites are commonly used to break viscosified fluids at moderate or higher temperatures, in this context meaning greater than 100° F. However, at low temperatures below 100° F., their activity is low. Hence, high concentrations and excessive volumes of hypochlorites are required for initiating the breaking action. Even in these situations, it is difficult to achieve viscosities comparable to those of water (1.0 cP), which is the ideal objective. In field applications where large quantities of fluid viscosified with xanthan are required to be broken, using enormous quantities of hypochlorite breakers becomes highly impractical and expensive.

In cases where a delayed break is desired, such as a downhole well application, at moderate temperatures above 100° F. (38° C.) and higher, this can be achieved by a reduction of the concentration of the oxidizer. However, there is a limit to the degree to which the concentration of the oxidizer can be reduced because, as noted above, there are a certain number of cleavages in the polymer backbone that are necessary to achieve the desired reduction in viscosity.

Therefore, especially at low or very low temperatures, to achieve a delayed break, a control mechanism other than the concentration of strong oxidizer alone is necessary.

A prior invention for Halliburton discloses the method of using a composition comprising of water, a source of hydrogen peroxide (e.g., sodium perborate), and an activator for the source of hydrogen peroxide to break viscosified fluids used for treating portions of wellbore or formation at temperatures below 100° F. US patent Publication No. US 2008/0176770 A1, published Jul. 24, 2008, having for named inventors Michael W. Sanders, Jeffrey L. Mundy, Fong Fong Foo, and Rajesh K. Saini, entitled "Compositions & Methods for breaking a viscosity increasing polymer at very low temperature used in downhole well applications," is incorporated by reference in its entirety.

The purpose of this invention is to provide a breaker system that can effectively break a fluid viscosified with a synthetic polymer or a multi-chain polysaccharide. The method is especially useful at low temperatures, which in this context means at less than 100° F. Preferably, a breaker system should be able to effectively break such polyacrylamides or multi-chain polysaccharides at very low temperatures, which in this context means at less than 90° F. Other oxidizing systems such as peroxides with catalysts have been used though with little success for multi-chain polysaccharides at low temperatures, and especially at very low temperatures. Another purpose is to provide a breaker system that is simple to use and inexpensive.

It has been discovered that a persulfate compound activated by a strong base can break a fluid viscosified with a synthetic polymer or a multi-chain polysaccharide at low and very low temperatures.

A breaker system according to the invention can be used in an oilfield or pipeline application where a synthetic polymer or a multi-chain polysaccharide may be used in a fluid. It is particularly useful at low and very low temperatures.

A commonly used synthetic polymer is a polyacrylamide.

A commonly used multi-chain viscosity-increasing polysaccharide is xanthan. For example, xanthan is typically used in the range of from about 0.25% to about 1.5% by weight of the water in well fluids. Xanthan is being used, for example, in low-temperature gravel pack and frac-pack applications. For example, 0.2% xanthan exhibits some elasticity, and elasticity is expected to be observable down to about 0.1% by weight xanthan in water. Any returned fluid from a well or any unused well fluid exhibiting viscosity greater than 5 cP would be a candidate for low-temperature breaking of the fluid before other use, particularly for other use in a well or disposal.

An added advantage of this breaker system is the use of small relative volumes, which makes this system attractive and practical for field conditions. The breaker system can be a simple and inexpensive two-component system.

Another advantage of the compositions and methods according to the invention is the ability to break a fluid viscosified with a synthetic polymer or a multi-chain polysaccharide in a controlled manner at low temperature or very low temperature, that is, the rate of degradation of the polymer is not immediate and can be relatively slow. The rate of degradation of the fluid can be controlled, including by varying the concentration of persulfate or the mole ratio of persulfate to alkali.

Presently, the most preferred embodiment uses a simple two-component breaker system comprising sodium persulfate and sodium hydroxide. This breaker system can break a fluid of 60 lb/Mgal xanthan to a very low viscosity of 3 cP or less at 85° F. within a very short time of 24 hrs.

The persulfate anion is a very strong oxidant species. Without being limited by any theory, it is believed that the persulfate anion can be induced to form a sulfate free radical, which has an estimated redox potential of 2.6 V. These species can then initiate a free radical reaction to affect the breaking of viscosified fluids. According to the breaker system of the present invention, combination of the persulfate and the alkali generates free radicals that can break synthetic polymers such as polyacrylamides or break multi-chain polysaccharides such as xanthan. Persulfate radicals are generated at temperatures above about 140° F. At temperatures below 140° F., however, persulfate needs to be activated so that persulfate radicals can be produced at lower temperatures.

The apparent viscosity of the fluid to be broken is greater than 5 cP. Preferably, the apparent viscosity of the fluid to be broken is greater than 10 cP. More preferably, the apparent viscosity of the fluid to be broken is in the range of 10 cP to 50 cP.

Preferably the synthetic polymer, multi-chain polysaccharide, or combination thereof is present in at least 0.24% by weight of the water (20 lb/Mgal) in the fluid, and more preferably in the range of 0.24% by weight of the water (20 lb/Mgal) to about 1% by weight of the water (about 80 lb/Mgal).

The persulfate is present in a sufficient concentration to break the viscosity of a fluid comprising water and the synthetic polymer or the multi-chain polysaccharide, or any combination thereof. The concentration of the persulfate and the strong base can be adjusted to help control the break times. For example, the persulfate is preferably present in at least about 0.4% by weight (about 30 lb/Mgal) of the water, and more preferably in the range of about 0.5% by weight (about 40 lb/Mgal) to about 3% by weight (about 250 lb/Mgal) of the water of the fluid to be broken.

A well fluid according to the invention is preferably injected at a temperature of less than 150° F. (65° C.). This temperature range is within the normal ambient temperature range at the wellhead and avoids any need for heating the treatment fluid. The treatment fluid has particular application when injected at a temperature below 100° F. (38° C.). The treatment fluids and methods according to the invention are especially useful at low temperatures, at which fluids viscosified with xanthan are more difficult to break, such as where the design temperature of the subterranean formation is less than 100° F. (38° C.).

In addition, it is presently believed that this breaker system of persulfate and strong base would work on other water-soluble polymers. More particularly, it is presently expected that this breaker system would be effective to break water-soluble synthetic polymers, such as those used as friction reducers in well fluids. Still more particularly, it is presently expected that this breaker system would be effective to break a fluid of a water-soluble polyacrylamide.

In comparison to certain other oxidizing systems, the components of the alkaline persulfate according to this invention can be provided in aqueous solutions that can be metered as liquid additives. This can offer handling advantages over solid additives such as certain peroxides. In addition, the alkaline persulfate can break in much shorter times at low temperatures.

Another advantage of the alkaline persulfate breaker system is that it is an environmental friendly system.

Surface or Subsurface Applications

According to an embodiment, methods are provided for breaking the viscosity of a fluid having an apparent viscosity greater than 5 cP, wherein the viscous fluid comprises a synthetic polymer or a multi-chain polysaccharide or a combination thereof in water. The method includes the step of contacting the viscous fluid with: (i) one or more water-soluble persulfates; and (ii) one or more strong bases. Preferably, the step of contacting is at one or more temperatures less than 150° F. More preferably, the step of contacting is at one or more temperatures less than 100° F.

The methods are useful at very low temperatures, wherein the step of contacting is at one or more temperatures less than 90° F. Most preferably, the step of contacting is at one or more temperatures less than 80° F. Most preferably, the portion of the well has a design temperature greater than 70° F.

As discussed in more detail, the methods are useful in several applications, including, for example, treating of flow-back water, unused treatment fluid, pipeline cleaning, etc.

Preferably, the step of contacting further involves mixing. The mixing can be by any convenient technique.

The one or more water-soluble persulfates can be used in any convenient form, such as solid particulate or pre-dissolved in an aqueous solution. Similarly, the one or more strong bases can be used in any convenient form, such as solid particulate or pre-dissolved in an aqueous solution.

Preferably, the step of contacting does not dilute the fluid more than 10 percent by volume. More preferably, the step of contacting does not dilute the fluid more than 5 percent by volume.

The fluid to be broken can be of various sources or types. Most commonly, it is expected that the fluid to be broken will be one in which the continuous phase of the fluid comprises the synthetic polymer or multi-chain polysaccharide in water. Advantageously, the water can be a brine.

In an embodiment, the synthetic polymer or the multi-chain polysaccharide or the combination thereof is in at least a sufficient concentration in the water such that the fluid to be broken has a viscosity greater than 5 cP. Preferably, the apparent viscosity of the fluid to be broken is greater than about 10 cP. More preferably, the apparent viscosity of the fluid to be broken is in the range of about 10 cP to about 50 cP. For example, a fluid of 20 lb/Mgal xanthan in tap water shows 10 cP apparent viscosity as measured with a Fann 35 viscometer at 300 rpm (511 sec-1 shear rate).

In an embodiment, the multi-chain polysaccharide is xanthan.

Preferably, the one or more persulfates are in a weight ratio of at least 0.5 to 1 of a synthetic polymer or the multi-chain polysaccharide or combination thereof in the fluid. In another embodiment, the one or more persulfates are in a concentration of at least 30 lb/Mgal of the viscous fluid.

Preferably, the one or more persulfates are selected from the group consisting of sodium persulfate, potassium persulfate, ammonium persulfate, and any combination thereof. More preferably, the one or more persulfates are selected from the group consisting of sodium, potassium persulfate, and any combination thereof.

In an embodiment, the one or more strong bases are in a mole ratio based on hydroxide of at least 0.5 to 1 of the one or more persulfates.

Preferably, the one or more strong bases are selected from the group consisting of sodium hydroxide, potassium hydroxide, sodium carbonate, potassium carbonate and any combination thereof. Most preferably, the one or more strong bases are selected from the group consisting of sodium hydroxide, potassium hydroxide, and any combination thereof.

Delayed Break in Well Fluid Application

According to another embodiment, methods are provided of treating a well, wherein the methods include the steps of: (a) forming a treatment fluid comprising: (i) water; and (ii) one or more synthetic polymers, multi-chain polysaccharides, or combination thereof wherein the synthetic polymers, multi-chain polysaccharides, or combination thereof are in at least a sufficient concentration in the water such that the first treatment fluid has a viscosity of at least 5 cP; (iii) one or more persulfates; and (iv) one or more strong bases; and (b) introducing the treatment fluid into the well and directing the treatment fluid to a portion of the well. Preferably, the portion of the well has a design temperature less than 150° F. More preferably, the portion of the well has a design temperature less than 100° F.

The methods are useful at very low temperatures, wherein the portion of the well has a design temperature less than 90° F. Most preferably, the portion of the well has a design temperature greater than 70° F.

Preferably, the water is of any convenient source that does not have any component that would interfere with the chemistry of hydrating the polysaccharide, the chemistry of the breaking, the intended use of the viscosified treatment fluid, or the use of the fluid after breaking.

Preferably, the methods further include the steps of: (a) after the step of introducing, allowing the treatment fluid to break in the portion of the well; and then (b) flowing back from the well.

The treatment fluid can further include proppant or gravel.

The step of introducing the treatment fluid can further include introducing above the fracture pressure of the subterranean formation.

The step of introducing the treatment fluid can further include: gravel packing, which is below the fracture pressure of the subterranean formation.

Stepwise Well Fluid Application

According to yet another embodiment, methods are provided of treating a well, wherein the method include the steps of: (a) forming a first treatment fluid comprising: (i) water; and (ii) one or more synthetic polymers, multi-chain polysaccharides, or a combination thereof, wherein the synthetic polymers, multi-chain polysaccharides, or the combination thereof are in at least a sufficient concentration in the water such that the first treatment fluid has a viscosity of at least 5 cP; (b) forming a second treatment fluid comprising: (i) one or more persulfates; and (ii) one or more strong bases; (c) introducing the first treatment fluid into the well; (d) introducing the second treatment fluid into the well; and (e) directing the first treatment fluid and the second treatment fluid to contact each other in a portion of the well. Preferably, the portion of the well has a design temperature less than 150° F. More preferably, the portion of the well has a design temperature less than 100° F.

The methods are useful at very low temperatures, wherein the portion of the well has a design temperature less than 90° F. Most preferably, the portion of the well has a design temperature greater than 70° F.

Preferably, the water is of any convenient source that does not have any component that would interfere with the chemistry of hydrating the polysaccharide, the chemistry of the breaking, the intended use of the viscosified treatment fluid, or the use of the fluid after breaking.

Preferably, the method further includes the steps of: (a) after the step of directing the first treatment fluid and the second treatment fluid to contact each other in a portion of the well, allowing the second fluid to break the viscosity of the first fluid in the portion of the well; and then (b) flowing back from the well.

The step of introducing the first treatment fluid into the well can be before the step of introducing the second treatment fluid into the well. In a different embodiment, the step of introducing the first treatment fluid into the well is after the step of introducing the second treatment fluid into the well. Thus, the second treatment fluid comprising the one or more persulfates can be introduced according to an overflush technique or according to a "poison pill" technique.

In an embodiment, the first treatment fluid further comprises proppant or gravel.

In an embodiment, the step of introducing the first treatment fluid further comprises introducing above the fracture pressure of the subterranean formation.

In another embodiment, the step of introducing the first treatment further comprises: gravel packing, which is below the fracture pressure of the formation.

EXAMPLES

General procedure: to a blender jar, add the water and xanthan and allow the xanthan to fully hydrate. Measure the viscosity of the fluid at the start (that is, upon hydration of the xanthan); add the sodium persulfate and the sodium hydroxide; place the test sample in a temperature bath; measure the viscosity over time.

Unless otherwise specified, the water used in these examples is fresh tap water. Sodium persulfate is sometimes reported as simply "persulfate." Sodium hydroxide is sometimes reported as simply "hydroxide."

All temperatures are reported in degrees Fahrenheit (° F.).

In all the experiments, apparent viscosity in centiPoise (cP) was measured on a Fann Model 35 viscometer using R1 rotor, B1 bob, and F1 spring at 300 rpm, equivalent to 511 $sec^{-1}$ shear. Viscosity readings were taken on a F1 spring Fann 35 Viscometer. The initial viscosity readings were taken with the viscosified fluid at room temperature (about 77° F.). All other readings were taken with the test sample placed in a temperature bath of the stated temperature. The samples were placed in the temperature bath of the stated temperature. Each day, the bottles were removed from the temperature bath and immediately readings were taken on the Fann 35 viscometer.

Xanthan loading used was a 60 lb/Mgal in fresh tap water or a 9.1 ppg NaCl brine. The initial viscosity of the fluid was 39.0 cP. The persulfate used was sodium persulfate. The hydroxide used was sodium hydroxide. Concentrations of the persulfate are reported in pounds per 1000 gallons (lb/Mgal). Concentrations of the hydroxide concentrations are reported in mole ratio to the persulfate concentration. The fluid was considered to be broken when viscosity of 3.0 cP or less was measured.

For a fluid of 60 lb/Mgal xanthan in tap water at 85° F., Table 1 shows the effect on the break time of varying the mole ratio of hydroxide to persulfate, using a persulfate concentration of 50 lb/Mgal persulfate.

TABLE 1

| Xanthan Loading | Test Temp. | Conc. of Sodium Persulfate | Mole Ratio Persulfate | Mole Ratio Hydroxide | Broken Viscosity | Break Time |
|---|---|---|---|---|---|---|
| 60 lb/Mgal in tap water | 85° F. | 50 lb/Mgal (0.60% w/v) | 1.0 | 0.5 | 3.0 cP | Day 10 (240 hrs) |
| | | | 1.0 | 0.6 | 3.0 cP | Day 8 (192 hrs) |
| | | | 1.0 | 0.7 | 3.0 cP | Day 6 (144 hrs) |
| | | | 1.0 | 0.8 | 3.0 cP | Day 5 (120 hrs) |
| | | | 1.0 | 0.9 | 3.0 cP | Day 4 (96 hrs) |
| | | | 1.0 | 1.0 | 3.0 cP | Day 3 (72 hrs) |
| | | | 1.0 | 1.1 | 2.5 cP | Day 3 (72 hrs) |
| | | | 1.0 | 1.2 | 2.5 cP | Day 3 (72 hrs) |
| | | | 1.0 | 1.3 | 3.0 cP | Day 2 (48 hrs) |
| | | | 1.0 | 1.4 | 2.5 cP | Day 2 (48 hrs) |
| | | | 1.0 | 1.5 | 3.0 cP | Day 1 (24 hrs) |
| | | | 1.0 | 3.0 | 1.5 cP | Day 1 (24 hrs) |
| | | | 1.0 | 4.5 | 1.5 cP | Day 1 (24 hrs) |
| | | | 1.0 | 6.0 | 1.0 cP | Day 1 (24 hrs) |

For a fluid of 60 lb/Mgal xanthan in tap water at 85° F., Table 2 shows the effect on break time of varying the mole ratio of hydroxide to persulfate, using a persulfate concentration of 40 lb/Mgal.

TABLE 2

| Xanthan Loading | Test Temp. | Conc. of Sodium Persulfate | Mole Ratio Persulfate | Mole Ratio Hydroxide | Broken Viscosity | Break Time |
|---|---|---|---|---|---|---|
| 60 lb/Mgal in tap water | 85° F. | 40 lb/Mgal (0.48% w/v) | 1.0 | 0.5 | Unbroken (5.0 cP) | after 12 days |
| | | | 1.0 | 0.6 | 3.0 cP | Day 10 (240 hrs) |
| | | | 1.0 | 0.7 | 3.0 cP | Day 7 (168 hrs) |
| | | | 1.0 | 0.8 | 3.0 cP | Day 5 (120 hrs) |
| | | | 1.0 | 0.9 | 3.0 cP | Day 5 (120 hrs) |
| | | | 1.0 | 1.0 | 3.0 cP | Day 5 (120 hrs) |
| | | | 1.0 | 1.1 | 3.0 cP | Day 4 (96 hrs) |
| | | | 1.0 | 1.2 | 3.0 cP | Day 3 (72 hrs) |
| | | | 1.0 | 1.3 | 2.5 cP | Day 3 (72 hrs) |
| | | | 1.0 | 1.4 | 2.5 cP | Day 3 (72 hrs) |
| | | | 1.0 | 1.5 | 2.5 cP | Day 3 (72 hrs) |

The data in the Tables 1 and 2 show that at a particular temperature and at a particular persulfate concentration, the break times can be controlled by adjusting the concentration of the persulfate and the mole ratio of the hydroxide to the persulfate.

For a fluid of 60 lb/Mgal xanthan in tap water at 85° F., Table 3 shows the effect on break time of varying the concentration of persulfate, keeping a constant mole ratio of hydroxide to persulfate.

TABLE 3

| Xanthan Loading | Test Temp. | Conc. of Sodium Persulfate | Mole Ratio Persulfate | Mole Ratio Hydroxide | Broken Viscosity | Break Time |
|---|---|---|---|---|---|---|
| 60 lb/Mgal in tap water | 85° F. | 30 lb/Mgal (0.36% w/v) | 1.0 | 1.0 | 3.0 cP | Day 8 (192 hrs) |
| | | 40 lb/Mgal (0.48% w/v) | 1.0 | 1.0 | 3.0 cP | Day 5 (120 hrs) |
| | | 50 lb/Mgal (0.60% w/v) | 1.0 | 1.0 | 3.0 cP | Day 3 (72 hrs) |

Data in Table 3 shows that at a particular temperature, break times can be controlled by adjusting the concentration of the persulfate.

For a fluid of 60 lb/Mgal xanthan in tap water, Table 4 shows the effect of varying the temperature on the break time.

TABLE 4

| Xanthan Loading | Test Temp. | Conc. of Sodium Persulfate | Mole Ratio Persulfate | Mole Ratio Hydroxide | Broken Viscosity | Break Time |
|---|---|---|---|---|---|---|
| 60 lb/Mgal in tap water | 90° F. | 50 lb/Mgal (0.60% w/v) | 1.0 | 1.0 | 3.0 cP | Day 1 (24 hrs) |
| | 85° F. | | 1.0 | 1.0 | 3.0 cP | Day 3 (72 hrs) |
| | 80° F. | | 1.0 | 1.0 | 3.0 cP | Day 6 (144 hrs) |

Data in Table 4 shows that the activated breaker composition can be used to effectively break fluids viscosified with xanthan at very low temperatures, in this context meaning down to 80° F.

For a fluid of 60 lb/Mgal xanthan in 9.1 ppg NaCl brine at 90° F., Table 5 shows the effect on break time of varying the mole ratio of hydroxide to persulfate, using a persulfate concentration of 50 lb/Mgal.

TABLE 5

| Xanthan Loading | Test Temp. | Conc. of Sodium Persulfate | Mole Ratio Persulfate | Mole Ratio Hydroxide | Broken Viscosity | Break Time |
|---|---|---|---|---|---|---|
| 60 lb/Mgal in 9.1 ppg NaCl brine | 90° F. | 50 lb/Mgal (0.60% w/v) | 1.0 | 0.8 | 3.0 cP | Day 4 (96 hrs) |
| | | | 1.0 | 0.9 | 3.0 cP | Day 3 (72 hrs) |
| | | | 1.0 | 1.0 | 3.0 cP | Day 1 (24 hrs) |

Data in Table 5 shows that at a particular temperature and at a particular persulfate concentration in a brine, the break times can be controlled by adjusting the ratio of persulfate:hydroxide. It also shows that the alkaline activated persulfate mechanism can work to break fluids of xanthan in brines.

In addition, the experimental data described below highlights the utility of this breaker recipe towards breaking of fluid containing a polyacrylamide friction reducer to essentially water-like viscosities of about 1.0 cP (measured at a shear rate of 511 sec$^{-1}$ on a Fann 35 viscometer).

A solution of "FR-56"™, which is a polyacrylamide friction reducer commercially available from Halliburton Energy Services, Inc., was prepared in fresh water at a concentration of 1.0 gal/Mgal. 200 ml of this solution was taken in different bottles to which a sufficient amount of a 25% w/v solution of sodium persulfate was added to provide the required amount of sodium persulfate in each of the test bottle. For alkaline activation of the persulfate, the pH of each of these bottles was adjusted to the desired value with the help of a 25% w/v aqueous solution of NaOH.

The preliminary test results are shown in Tables 6 and 7, below.

TABLE 6

| FR-56 ™ | Test Temp. | Sodium Persulfate | pH adjusted with 25% w/v solution of NaOH | Initial viscosity | Break Time (when viscosity drops to 1.0 cP) | Broken viscosity |
|---|---|---|---|---|---|---|
| 1.0 gal/Mgal | 85° F. | 1.0 lb/Mgal | 10.5 | 9.0 cP | 12 hrs | 1.0 cP |
| 1.0 gal/Mgal | 85° F. | 1.0 lb/Mgal | 11.0 | 9.0 cP | 7 hrs | 1.0 cP |
| 1.0 gal/Mgal | 85° F. | 1.0 lb/Mgal | 11.5 | 9.0 cP | 4 hrs | 1.0 cP |

TABLE 7

| FR-56 ™ | Test Temp. | Sodium Persulfate | pH adjusted with 25% w/v solution of NaOH | Initial viscosity | Break Time (when viscosity drops to 1.0 cP) | Broken viscosity |
|---|---|---|---|---|---|---|
| 1.0 gal/Mgal | 85° F. | 1.0 lb/Mgal | 11.0 | 9.0 cP | 7 hrs | 1.0 cP |
| 1.0 gal/Mgal | 90° F. | 1.0 lb/Mgal | 11.0 | 9.0 cP | 3 hrs | 1.0 cP |

Tables 6 and 7 show that persulfate can be sufficiently activated to effectively break a polyacrylamide friction reducer that is typically used in slick water fracturing and HRWP gravel packing operation to water-like viscosity at such a low temperature of 85° F.

This data also indicates that the break time can be optimized depending upon the requirements by changing the amount of the alkaline activator. The tables above also show that the disclosed breaker system can help break a polyacrylamide friction reducer in as short a time as 3 hours.

Water shut-off applications often use copolymers of polyacrylamide and t-butyl acrylate. This copolymer is further crosslinked using organic crosslinkers of the type similar to polyethyleneimine. The breaker described in this particular invention are expected to work in breaking down the copolymers of polyacrylamide and t-butyl acrylate as well as the crosslinked polymer formed using polyethyleneimine The breaker is also expected to work on water-soluble polyacrylamide derivatives like poly(N,N-dimethyl acrylamide) and its water soluble copolymer with acrylamide formed by incorporating varying percentages of N,N-dimethyl acrylamide.

CONCLUSIONS

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to move the fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method for breaking a fluid having an apparent viscosity greater than 5 cP, wherein the fluid comprises one or more water-soluble synthetic polymers, wherein the water-soluble synthetic polymers are selected from the group consisting of: a polyacrylamide, a copolymer of polyacrylamide, a derivative of polyacrylamide, a derivative of polyacrylamide copolymer, and any combination thereof, the method comprising the steps of:
   contacting the fluid with:
   (i) one or more water-soluble persulfates; and
   (ii) one or more strong bases, wherein the fluid is contacted with the one or more strong bases in an amount sufficient to adjust the fluid to a pH of at least 10.5; and
   allowing the fluid to break to an apparent viscosity of 3 cP or less at a surface of a well site at a temperature less than 100° F.

2. The method according to claim 1, wherein the fluid comprises a brine.

3. The method according to claim 1, wherein the step of contacting does not dilute the fluid more than 10 percent by volume.

4. The method according to claim 1, wherein the fluid having an apparent viscosity greater than 5 cP is selected from the group consisting of: a flow-back fluid, an unused well fluid, a push pill, a pipeline cleaning fluid, and any combination thereof.

5. The method according to claim 1, wherein the water-soluble synthetic polymers are in at least a sufficient concentration in the water such that the fluid has a viscosity greater than 5 cP.

6. The method according to claim 1, wherein the one or more water-soluble synthetic polymer are anionic or cationic.

7. The method according to claim 1, wherein the one or more persulfates are in a weight ratio of at least 0.5 to 1 of the one or more synthetic polymers in the water of the fluid.

8. The method according to claim 1, wherein the one or more strong bases are in a mole ratio based on hydroxide of at least 0.5 to 1 of the one or more persulfates.

9. A method for breaking a fluid having an apparent viscosity greater than 5 cP, wherein the fluid comprises one or more water-soluble synthetic polymers, wherein the water-soluble synthetic polymers are selected from the group consisting of: a polyacrylamide, a copolymer of polyacrylamide, a derivative of polyacrylamide, a derivative of polyacrylamide copolymer, and any combination thereof, the method comprising the steps of:
  contacting the fluid with:
    (i) one or more water-soluble persulfates; and
    (ii) one or more strong bases, wherein the fluid is contacted with the one or more strong bases in an amount sufficient to adjust the fluid to a pH of at least 10.5, wherein the step of contacting is at one or more temperatures less than 100° F.; and
  allowing the fluid to break to an apparent viscosity of 3 cP or less at a surface of a well site at a temperature less than 100° F.

10. The method according to claim 9, wherein the fluid comprises a brine.

11. The method according to claim 9, wherein the step of contacting does not dilute the fluid more than 10 percent by volume.

12. The method according to claim 9, wherein the fluid having an apparent viscosity greater than 5 cP is selected from the group consisting of: a flow-back fluid, an unused well fluid, a push pill, a pipeline cleaning fluid, and any combination thereof.

13. The method according to claim 9, wherein the water-soluble synthetic polymers are in at least a sufficient concentration in the water such that the fluid has a viscosity greater than 5 cP.

14. The method according to claim 9, wherein the one or more water-soluble synthetic polymer are anionic or cationic.

15. The method according to claim 9, wherein the one or more persulfates are in a weight ratio of at least 0.5 to 1 of the one or more synthetic polymers in the water of the fluid.

16. The method according to claim 9, wherein the one or more strong bases are in a mole ratio based on hydroxide of at least 0.5 to 1 of the one or more persulfates.

* * * * *